US012741852B2

(12) United States Patent
Urban et al.

(10) Patent No.: US 12,741,852 B2
(45) Date of Patent: Sep. 22, 2026

(54) VEHICLE CRANE HAVING A DETACHABLE ATTACHMENT SUPERSTRUCTURE AND METHOD FOR RIGGING THE SAME

(71) Applicant: Tadano Demag GmbH, Zweibrücken (DE)

(72) Inventors: Christian Moritz Urban, Zweibrücken (DE); Matthias Roth, Waldmohr (DE)

(73) Assignee: Tadano Demag GmbH, Zweibrücken (DE)

(*) Notice: Subject to any disclaimer, the term of this patent is extended or adjusted under 35 U.S.C. 154(b) by 287 days.

(21) Appl. No.: 18/458,529

(22) Filed: Aug. 30, 2023

(65) Prior Publication Data

US 2024/0076169 A1 Mar. 7, 2024

(30) Foreign Application Priority Data

Sep. 2, 2022 (DE) ........................ 102022122282.9

(51) Int. Cl.
*B66C 23/76* (2006.01)
*B66C 23/36* (2006.01)

(52) U.S. Cl.
CPC ............ *B66C 23/76* (2013.01); *B66C 23/365* (2013.01); *B66C 2700/0342* (2013.01)

(58) Field of Classification Search
CPC ....... B66C 23/76; B66C 23/365; B66C 23/26; B66C 23/8236; B66C 2700/0342
See application file for complete search history.

(56) References Cited

U.S. PATENT DOCUMENTS 5,586,667 A * 12/1996 Landry .................. B66C 23/76 212/196
8,302,789 B2 * 11/2012 Hanahara ............... B66C 23/36 212/175
10,647,554 B2 * 5/2020 Oelberger .............. B66C 23/36
2010/0213155 A1 * 8/2010 Hanahara ............... B66C 23/36 212/294
2021/0189684 A1 * 6/2021 Yamashita ............. E02F 3/965
2023/0117144 A1 * 4/2023 Motoyama ........... B66C 23/365 212/223

FOREIGN PATENT DOCUMENTS

| | | | |
|---|---|---|---|
| DE | 2917829 | A1 | 11/1980 |
| DE | 3838975 | A1 | 5/1990 |
| DE | 102015006439 | A1 | 9/2016 |
| EP | 0779235 | A2 | 6/1997 |

* cited by examiner

*Primary Examiner* — Robert W Hodge
*Assistant Examiner* — Juan J Campos, Jr.
(74) *Attorney, Agent, or Firm* — Gardner, Linn, Burkhart & Ondersma LLP

(57) ABSTRACT

A vehicle crane having a superstructure that is rotatably mounted on a lower carriage and has a telescopic main jib, where the superstructure consists of a base superstructure and an attachment superstructure arranged in a detachable manner thereon, and the attachment superstructure receives at least one main counterweight. At least one auxiliary support is provided that acts as a hinged support and is fastened to the attachment superstructure, where the rear end of which auxiliary support is suspended via a guying member, and an auxiliary counterweight is suspended from the rear end of the at least one auxiliary support. The invention also relates to a method for rigging such a vehicle crane.

21 Claims, 6 Drawing Sheets

VEHICLE CRANE HAVING A DETACHABLE ATTACHMENT SUPERSTRUCTURE AND METHOD FOR RIGGING THE SAME

CROSS REFERENCE TO RELATED APPLICATION

The present application claims the priority benefits of German application no. DE10 2022 122 282.9, filed on Sep. 2, 2022.

BACKGROUND AND FIELD OF THE INVENTION

The invention relates to a vehicle crane having a superstructure which is rotatably mounted on a lower carriage and has a telescopic main jib, wherein the superstructure consists of a base superstructure and an attachment superstructure arranged in a detachable manner thereon. The invention also relates to a method for rigging such a vehicle crane.

European laid-open document EP 0 779 235 A2 discloses a mobile crane, comprising a lower carriage with crawler tracks or wheels and a superstructure which is rotatably mounted on the lower carriage and has a telescopic main jib. A short lattice mast is bolted to a rear end of the superstructure in the manner of a guying bracket and receives, inter alia, lifting and luffing mechanisms otherwise arranged in the superstructure. The lifting and luffing mechanisms which are thus displaced to the rear are intended to contribute to an increase in the counterweight. The short lattice mast can be bolted to the superstructure in a horizontal or a rearwards rising orientation. Moreover, the short lattice mast consists of a base mast which is bolted to the superstructure and has a suspended main weight and an auxiliary mast which is arranged so as to be pivotable on the base mast and has a further suspended secondary counterweight. The lifting and luffing mechanisms are arranged in the base mast. By means of the pivotable auxiliary mast, the secondary counterweight can be lifted from the ground from an inoperative position on the ground to an operative position.

German laid-open document DE 38 38 975 A1 discloses a further vehicle crane having a lower carriage, a superstructure, a telescopic main jib and a counterweight. The counterweight is not part of the superstructure, consists of a counterweight support with counterweight plates and is suspended by means of a suspension rod. The suspension rod, in turn, is suspended from a mast arranged in the manner of a guying bracket in a luffable manner on the superstructure. In addition, the counterweight support is guided via a horizontal guide rod at a spaced interval with respect to and on the superstructure. In this case, the mast, the suspension rod and the guide rod are each telescopic in order to increase or decrease the spaced interval between the counterweight and the superstructure and thus an associated counterweight moment as required. In order to move the vehicle crane, the mast, the suspension rod and the guide rod are telescoped in, the mast is folded in and the mast, the suspension rod, the guide rod and counterweight support are placed down on the lower carriage. In a conventional manner for the operation of the vehicle crane, the counterweight support which can also be transported on the lower carriage can be loaded with individual counterweight plates which can be transported separately to the place of usage.

Furthermore, German laid-open document DE 10 2015 006 439 A1 discloses a mobile crane having counterweight arrangement which can be attached to a superstructure and is transported separately to the place of usage. The counterweight arrangement comprises a base frame which can be separated from the superstructure, a winch and two opposing pivot arms which are articulated to the base frame and each have a counterweight stack. The pivot arms can each be pivoted with respect to the base frame about a vertical bearing in order to move the counterweight stacks in a horizontal plane for changing the counterweight radius and/or the pivot radius of the superstructure. In order to mount the counterweight arrangement on the superstructure, ballasting cylinders are arranged on the counterweight arrangement, with the aid of which a counterweight arrangement placed on a lower carriage of the mobile crane can be raised for coupling to the superstructure.

Furthermore, German laid-open document DE 29 17 829 A1 discloses a further vehicle crane comprising a superstructure. The superstructure receives a counterweight in a known manner. Also, the superstructure has a rearwards protruding hinged support articulated thereto, said hinged support being pivotable about a horizontal axis and the free end thereof being suspended at the top from a telescoping jib of the vehicle crane via guying means. An auxiliary counterweight is likewise suspended from the free end of the hinged support.

SUMMARY OF THE INVENTION

The present invention provides a vehicle crane and a method for rigging a vehicle crane, by means of which a more flexible adaptation to usage conditions is possible.

In accordance with an embodiment of the invention, in the case of a vehicle crane having a superstructure which is rotatably mounted on a lower carriage and has a telescopic main jib, wherein the superstructure consists of a base superstructure and an attachment superstructure arranged in a detachable manner thereon and the attachment superstructure receives at least one main counterweight, a more flexible adaptation to usage conditions is achieved by virtue of the fact that at least one auxiliary support acting as a hinged support is fastened to the attachment superstructure, the rear end of which auxiliary support is suspended from a main jib head via a guying means or structure or system, in particular on the main jib and/or on an auxiliary jib and/or on an adapter, and an auxiliary counterweight is suspended from the rear end of the at least one auxiliary support. The hinged support is connected to the attachment superstructure via a joint in a conventional manner, so that only compression forces and no bending forces are introduced into the attachment superstructure. The modular structure of the vehicle crane advantageously provides more flexible adaptation to the usage conditions of the vehicle crane. The attachment superstructure, which can be detached from the base superstructure and has the main counterweight, and also the at least one auxiliary support can thus be transported in a flexible manner together with or separately from the vehicle crane between the respective places of usage of the vehicle crane. This ensures that the vehicle crane may travel on public roads in a road-travel state relieved of components, such as e.g. the attachment superstructure, the main counterweight and the at least one auxiliary support, in compliance with associated and local regulations, such as e.g. maximum axle load and permissible total weight, between the places of usage. By means of the at least one auxiliary support and the flying auxiliary counterweight, the counterweight moment can be adapted in a further range to the usage conditions of the vehicle crane. This type of rigging of the vehicle crane with a flying auxiliary counterweight is particularly suitable for main jibs having an extended total length of about 35 m. By using the flying auxiliary counterweight with a larger counterweight radius, the weight of the required total counterweight can be reduced accordingly.

In structural terms, provision is made in an advantageous manner that the at least one auxiliary support is fastened in an articulated manner to the attachment superstructure. This allows the effective weight moment of the auxiliary counterweight and the rear outreach of the vehicle crane to be easily adapted to the usage conditions by pivoting the auxiliary support in the horizontal and/or vertical direction. The articulated arrangement also allows the counterweight to be set down passively when the crane or the guying means is unloaded, so that tilting rearwards can be prevented. In this case, a crane system which is braced to the front, in particular consisting of the main jib, guying means, counterweights, auxiliary supports, lifting cable and load, will deform to the rear when the load is being set down and a counterweight close to the ground will be set down on the ground surface. By means of the permitted passive pivoting capability, the articulated auxiliary support relieves the rear guying arrangement, in particular auxiliary supports and guying means.

In this case, it is advantageous that the at least one auxiliary support can be pivoted by an angle of 40 degrees to 130 degrees. This angle range is measured between a vertical extending through the joint with a horizontal pivot axis and a longitudinal axis of the at least one auxiliary support. The angle values increase by pivoting the at least one auxiliary support down towards the ground. An auxiliary support erected in parallel with the vertical has a pivot angle of 0 degrees.

The rigging procedure is facilitated by virtue of the fact that the auxiliary support is fastened to the attachment superstructure such that the auxiliary support can be placed on the ground or the lower carriage. In this case, the guying means are not yet fastened and are not tensioned. In a particular embodiment, the at least one auxiliary support is at least 3 m long.

In particular embodiments, provision is made that a first and a second auxiliary support each having an auxiliary counterweight extend rearwards starting from the attachment superstructure. In this case, at least the rear ends of the auxiliary supports are laterally spaced apart and arranged opposite one another in relation to a longitudinal direction of the attachment superstructure. Guying means allocated to the auxiliary counterweights can thus be run without crossing in relation to any luffing cables of a luffable auxiliary jib, which are arranged in a conventional manner in the region of the longitudinal direction of the attachment superstructure.

The at least one auxiliary support may be designed as a lateral superlift arm and can thus be used in connection with another type of rigging of the vehicle crane not as an auxiliary support but as a lateral superlift arm. In the case of longer main jibs having a length of more than 35 m, the auxiliary supports are used as lateral superlift arms and are fastened to the basic box of the main jib in a conventional manner.

In particular embodiments, provision is made that the at least one auxiliary support is divided into a start portion and an end portion which are connected to one another so as to be able to be folded in an articulated manner about a horizontal folding axis. This allows the desired counterweight moment from the auxiliary counterweights to be adapted even more flexibly in a wider range to the usage conditions of the vehicle crane.

Simplified attachment and detachment of the attachment superstructure can be achieved by virtue of the fact that the attachment superstructure can be raised from a rigging position on the lower carriage to an attachment position next to the base superstructure and the attachment superstructure can be detachably coupled to the base superstructure in the attachment position. For this purpose, provision is made in a particular manner that at least one rigging cylinder is arranged on the attachment superstructure and the attachment superstructure can be raised from the rigging position to the attachment position via said rigging cylinder.

As known from a typical superstructure, the at least one main counterweight is stationary relative to the base superstructure during operation of the vehicle crane. The term stationary does not include the rigging of the main counterweight, in which counterweight plates are stacked in a conventional manner.

In a structurally advantageous embodiment, provision is made that a first and a second main counterweight are provided which are arranged opposite and spaced apart from one another in relation to a longitudinal direction of the attachment superstructure. Therefore, a large counterweight and also installation space for further components on the attachment superstructure can be achieved at the same time.

Displacement of components and thus of weight from the base superstructure to the attachment superstructure can be achieved by virtue of the fact that at least one lifting mechanism and/or one winch mechanism are arranged on the superstructure.

Simplified mounting of the auxiliary support on the vehicle crane is achieved by virtue of the fact that the at least one auxiliary support is placed in a rigging position on or at the lower carriage and can be coupled to the attachment superstructure. For this purpose, a rest is arranged in an advantageous manner on the lower carriage, on which rest the at least one auxiliary support lies in the rigging position. This rest can also be used for placement of the main jib. Alternatively, the auxiliary support(s) can also be rigged directly onto the attachment superstructure from a rigging frame or a low loader. Here, a rigging frame can either stand on the ground or can be connected to a front or rear support beam, and possibly a front or rear frame of the lower carriage, for better orientation of the parts and in dependence upon the pivot position of the superstructure on the lower carriage.

In relation to a flexible adaptation of the total weight of the vehicle crane which can travel on public roads, provision is made that the base superstructure has no counterweight.

Typically, a vehicle crane which can travel on public roads advantageously has a lower carriage with wheels for travel on roads.

In a particular embodiment, provision is made that the rear end of the at least one auxiliary support is suspended from a main jib head via the guying means on the main jib and/or on an auxiliary jib and/or on an adapter. Preferably, the guying means are connected only to one of the aforementioned fastening points.

In accordance with aspects of the invention, such vehicle cranes can be rigged in a flexible manner in various ways. The methods in accordance with the present invention for rigging the vehicle crane described above permits the construction of a vehicle crane having a flying auxiliary counterweight. This method comprises the following steps: (i) placing the at least one auxiliary support in a rigging position on the lower carriage, (ii) fastening the at least one auxiliary support to the attachment superstructure, (iii) guying a rear end of the at least one auxiliary support via guying means on a main jib head and/or on an adapter adjoining same or an auxiliary jib, lattice part, (iv) suspending an auxiliary counterweight from the rear end of the at least one auxiliary support.

By means of the at least one auxiliary support and the flying auxiliary counterweight, the counterweight moment can be adapted in a further range to the usage conditions of the vehicle crane. In this regard, the lattice parts, such as e.g. an adapter on the main jib head, are subsequently allocated to the main jib. Alternatively, the at least one auxiliary support can also be placed in the rigging position on the ground or on a transport vehicle or an auxiliary frame.

In a particular embodiment, provision is made that, before placing the at least one auxiliary support in a rigging position on the lower carriage, the attachment superstructure is placed in a rigging position on the lower carriage, the attachment superstructure is raised with at least one rigging cylinder from its rigging position to an attachment position next to the base superstructure, and the attachment superstructure is fastened to the base superstructure. In a still further particular embodiment, provision is made that the at least one auxiliary support is fastened to the attachment superstructure in its rigging position or in its attachment position.

In an advantageous manner, an auxiliary crane for rigging can be dispensed with because the placement of the attachment superstructure and/or the main counterweight and/or the auxiliary support for the rigging procedure onto the attachment superstructure is effected by the vehicle crane itself which is to be rigged.

Exemplified embodiments of the invention will be explained in greater detail hereinafter with reference to the drawings.

DESCRIPTION OF THE PREFERRED EMBODIMENTS

Figure 1:
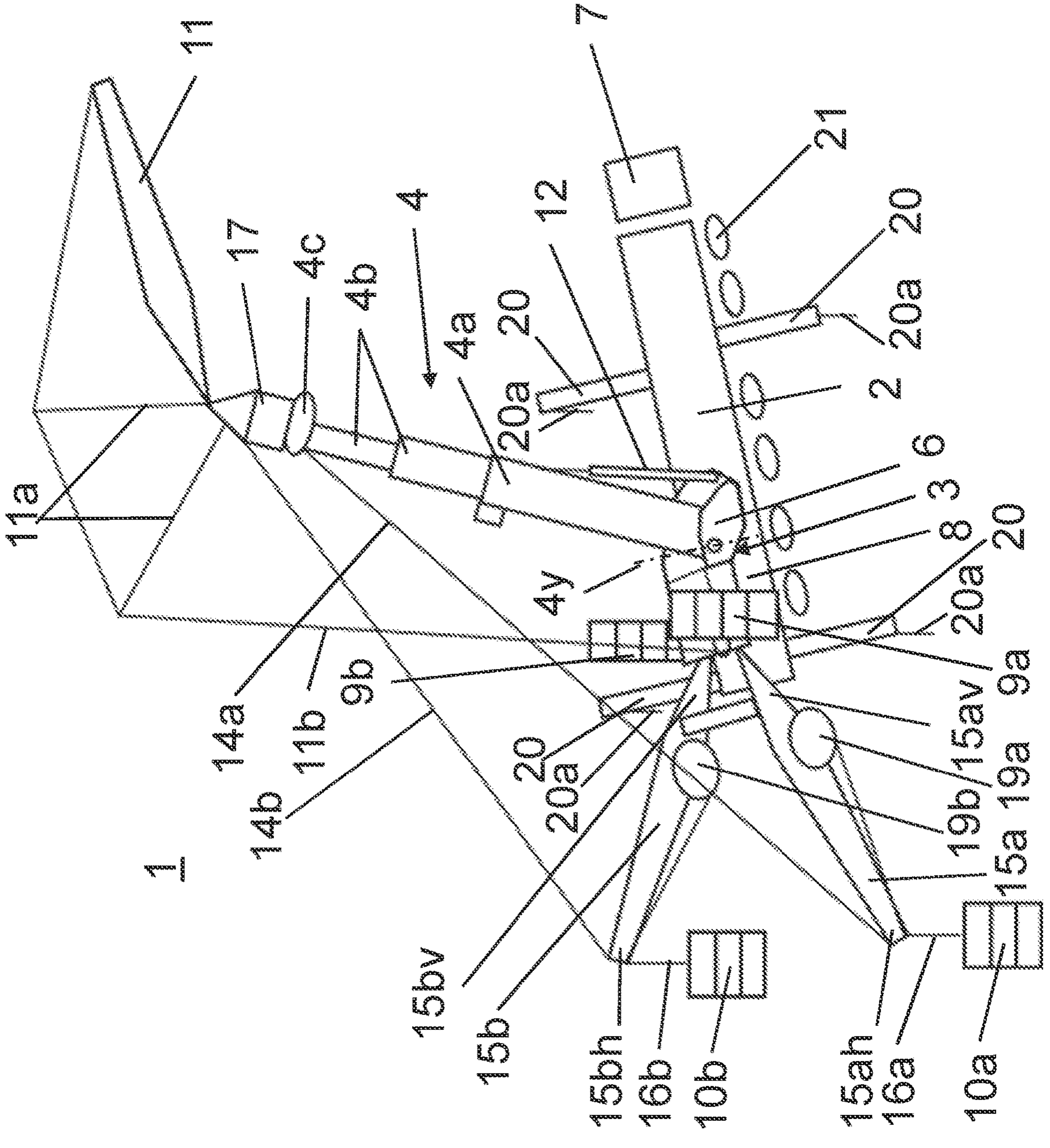
FIG. 1 shows a schematic perspective view of a vehicle crane in accordance with the present invention in a first type of rigging having two main counterweights and two auxiliary counterweights.

FIG. 1 shows a schematic perspective view of a vehicle crane 1 in accordance with the invention which comprises a lower carriage 2 having a cabin 7 for the driver and a superstructure 3 having a main jib 4 which can be erected and telescoped by means of a hydraulic luffing cylinder 12. The superstructure 3 is mounted on the lower carriage 2 so as to be able to pivot via a rotational connection 5 (see FIG. 2) about a vertical axis of rotation 3*z* (see FIG. 2). The vertical axis of rotation 3*z* is oriented in the z-direction of an imaginary Cartesian coordinate system.

Moreover, the superstructure 3 is divided into a base superstructure 6 at the front in relation to the axis of rotation 3*z* and into a rear attachment superstructure 8. The base superstructure 6 is supported on the lower carriage 2 via the rotational connection 5, supports the main jib 4 via a horizontal luffing axis 4*y* and the attachment superstructure 8 which can be detachably connected to the base superstructure 6. The horizontal luffing axis 4*y* is oriented in the y-direction of an imaginary Cartesian coordinate system. The base superstructure 6 is characterized substantially by the fact that it does not include either a counterweight or a lifting mechanism or a luffing mechanism, i.e. it is has no counterweight, lifting mechanism or luffing mechanism. These components are each part of the attachment superstructure 8. Since the attachment superstructure 8 is detachably connected to the base superstructure 6, it can be transported separately from the vehicle crane 1 between the respective places of usage of the vehicle crane 1. This ensures that the vehicle crane 1 may travel on public roads between the places of usage in a road driving state relieved of components, such as e.g. the attachment superstructure 8, in compliance with associated regulations, such as e.g. maximum axle load and permissible total weight.

In FIG. 1, the vehicle crane 1 is equipped in a first type of rigging with a telescopic main jib 4, two main counterweights 9*a*, 9*b*, two auxiliary counterweights 10*a*, 10*b* and a luffable auxiliary jib 11. It is also feasible to use a type of rigging having only one main counterweight 9*a*, 9*b* and one or two auxiliary counterweights 10*a*, 10*b*. The telescopic main jib 4 consists in a conventional manner of a basic box 4*a* and one or more inner boxes 4*b* which are mounted coaxially one inside the other and can telescope in and out. The basic box 4*a* is mounted so as to be luffable about the luffing axis 4*y* with respect to the superstructure 3 or the base superstructure 6 with the aid of the hydraulic luffing cylinder 12.

A luffable auxiliary jib 11 is connected to a main jib head 4*c* of the main jib 4 via an adapter 17. The auxiliary jib 11 is designed in a conventional manner with a lattice mast construction. The auxiliary jib 11 can also be designed as a box girder having a hollow box. The auxiliary jib 11 is produced in a conventional manner from steel. A fibre composite construction is also feasible. It is also feasible to have an auxiliary jib 11 constructed from jib portions of a different design, such as lattice mast, box, each consisting of steel or fibre composite. Luffing of the auxiliary jib 11 is effected in a conventional manner via one or, in this case, two luffing supports 11*a* in the region of the main jib head 4*c* or the adapter 17, via which a luffing cable 11*b* is run from a tip of the auxiliary jib 11 or a front region of the auxiliary jib 11 to a luffing mechanism 13 (see FIG. 2) on the attachment superstructure 8. The luffing mechanism 13 is designed in a conventional manner as a hydraulically driven cable drum.

Figure 2:
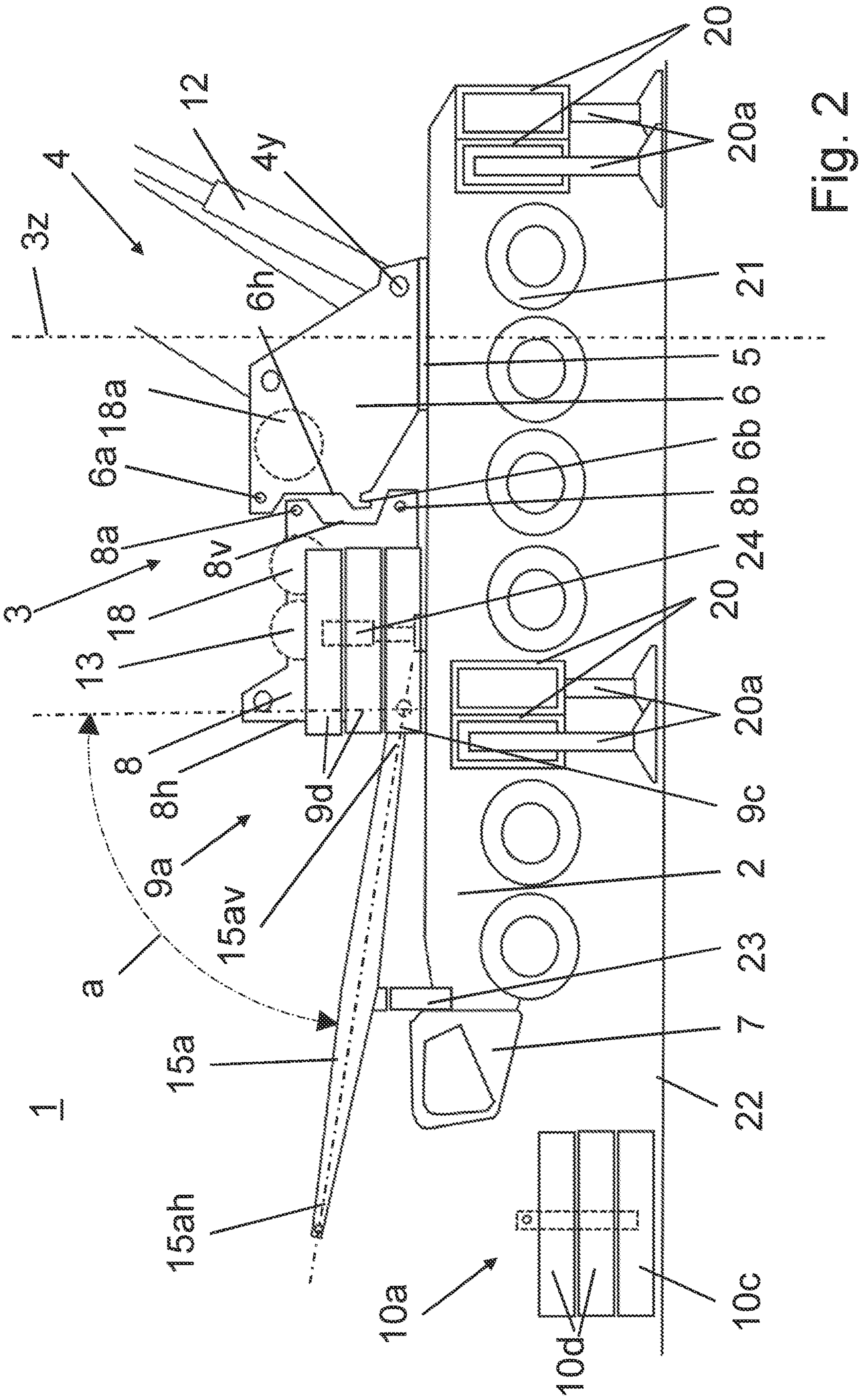
FIG. 2 shows a side view of FIG. 1 from the region of the superstructure and lower carriage in a first rigging state.

In addition, the main jib 4 is guyed by means of the two first and second auxiliary counterweights 10*a*, 10*b* and associated first and second guying means 14*a*, 14*b*, in particular cables, rods or combinations thereof comprising guying members or systems. In the present embodiment, the first and second guying means 14*a*, 14*b* are fastened in the region of the main jib head 4*c* of the main jib 4 and the adapter 17 respectively and are run from this location to a respective first rear end 15*ah* of a first auxiliary support 15*a* and a second rear end 15*bh* of a second auxiliary support 15*b*. The first and second auxiliary supports 15*a*, 15*b* are each fastened, in turn, at their opposite first and second front ends 15*av*, 15*bv* to the superstructure 3 and the attachment superstructure 8 via a joint. The first and second auxiliary supports 15*a*, 15*b* are thus so-called hinged supports which introduce only compressive forces and no bending forces into the attachment superstructure 8. The first and second auxiliary counterweights 10*a*, 10*b* are suspended from the first rear end 15*ah* of the first auxiliary support 15*a* and from the second rear end 15*bh* of the second auxiliary support 15*b* respectively via a respective first and second suspension means or members 16*a*, 16*b*. By means of the first and second auxiliary supports 15*a*, 15*b*, the two auxiliary counterweights 10*a*, 10*b* are spaced apart to the rear in each case from the superstructure 3 and the attachment superstructure 8, thereby increasing an effective counterweight radius corresponding to a spaced interval between the centers of gravity of each of the two auxiliary counterweights 10*a*, 10*b* and the vertical axis of rotation 3*z* of the superstructure 3. The first and second guying means 14*a*, 14*b* and also the first and second suspension means 16*a*, 16*b* are designed as cables, chains, rods or combinations thereof. In this case, the first and second auxiliary supports 15*a*, 15*b* are each fastened to a rear end 8*h* (see FIG. 2) of the attachment superstructure 8 so as to be detachable and articulated in a horizontal and vertical direction. As seen from above, the first and second auxiliary supports 15*a*, 15*b* extend starting from the attachment superstructure 8 away from one another in a v-shape and substantially symmetrically to a longitudinal axis of the superstructure 3. Since the first and second auxiliary supports 15*a*, 15*b* are fastened in an articulated manner to the attachment superstructure 8, the effective counterweight moment of the two auxiliary counterweights 10*a*, 10*b* can be changed, increased, decreased or adapted to the possible requirements of the use of the vehicle crane 1 by means of horizontal and/or vertical pivoting of the auxiliary supports 15*a*, 15*b*. Each of the auxiliary supports 15*a*, 15*b* is pivotable about an angle a of theoretically 0 degrees to 180 degrees, preferably of 40 degrees to 130 degrees. This angle range is measured between a vertical (illustrated as a dashed line in FIG. 2), extending through the joint with a horizontal pivot axis, and a longitudinal axis (illustrated as a dashed line in FIG. 2) of the at least one auxiliary support 15*a*, 15*b*. The angle values increase by pivoting the at least one auxiliary support 15*a*, 15*b* down towards the ground. An auxiliary support 15*a*, 15*b* erected in parallel with the vertical has an angle a of 0 degrees; an auxiliary support 15*a*, 15*b* extending in parallel with the horizontal has an angle a of 90 degrees. In FIG. 2, the angle a is about 80 degrees. The pivoting is effected via hydraulic cylinders, not illustrated, between the rear end 8*h* of the attachment superstructure 8 and the front ends 15*av*, 15*bv* of the two auxiliary supports 15*a*, 15*b*. In addition, provision can be made that the auxiliary supports 15*a*, 15*b* can be changed in length by means of additional components or are designed to be telescopic. The two auxiliary counterweights 10*a*, 10*b* are each constructed in a conventional manner as a stack with a base support 10*c* and individual counterweight plates 10*d* stacked thereon (see FIG. 2). So-called lateral superlift arms can be used as auxiliary supports 15*a*, 15*b*, which in other types of rigging of the vehicle crane 1 are typically used in the region of guying of the main jib 4 and are then articulated in the region of a head of the base box 4*a*.

Furthermore, it is apparent from FIG. 1 that a first and a second tensioning mechanism 19*a*, 19*b* are arranged approximately centrally on the respective auxiliary supports 15*a*, 15*b* in order to be able to tension the first and second guying means 14*a*, 14*b*. The first and second tensioning mechanisms 19*a*, 19*b* are typically designed as cable winches. For this purpose, deflection rollers, not illustrated, are arranged at the rear ends 15*ah*, 15*bh*, via which the first and second guying means 14*a*, 14*b* are run to the associated tensioning mechanisms 19*a*, 19*b*. The tensioning mechanisms 19*a*, 19*b* are typically designed as hydraulically driven cable drums and can also work together with pulley block-type reeving arrangements in the guying means 14*a*, 14*b*. It is also feasible to arrange the two tensioning mechanisms 19*a*, 19*b* not on the auxiliary supports 15*a*, 15*b* but instead on the superstructure 3, in particular the attachment superstructure 8.

In the first type of rigging described above, the main counterweight which is stacked on the attachment superstructure 8 is divided into a first main counterweight 9*a* and a second main counterweight 9*b*. In this case, the first and the second main counterweight 9*a*, 9*b* are arranged laterally offset, opposite and spaced apart from one another in relation to a longitudinal direction of the superstructure 3 and the attachment superstructure 8. In the operating position of the first and second main counterweights 9*a*, 9*b* illustrated in FIG. 1, the first and second main counterweights 9*a*, 9*b* are arranged in a stationary manner on the attachment superstructure 8. Typically, the first and second main counterweights 9*a*, 9*b* are arranged on an opposite and rear end of the superstructure 3, in particular rear end 8*h* of the attachment superstructure 6, in relation to the axis of rotation 3*z* of the superstructure 3 and the main jib 4. The first and second main counterweights 9*a*, 9*b* typically consist in each case of a stack of counterweight plates 9*d* stacked on a base support 9*c* (see FIG. 2). The base supports 9*c* are each fastened laterally to the attachment superstructure 8 or are part of the attachment superstructure 8.

In addition, the vehicle crane 1 typically has four lateral support beams 20, each with a vertically extendible hydraulic strut 20*a*, with which the vehicle crane 1 can be supported on a ground surface 22 (see FIG. 2) during operation. The lower carriage 2 is provided with pneumatic and/or rubber-tired wheels 21, enabling the vehicle crane 1 to travel on public roads.

FIG. 2 shows a side view of FIG. 1 from the region of the superstructure 3 and the lower carriage 2 in a first rigging state. The rigging of the vehicle crane 1 in accordance with the invention having the attachment superstructure 8, the two main counterweights 9*a*, 9*b*, the two auxiliary supports 15*a*, 15*b* and the two auxiliary counterweights 10*a*, 10*b* is explained in greater detail hereinafter with reference to FIGS. 2 to 4.

In FIG. 2, with the aid of an auxiliary crane, not illustrated, or with the vehicle crane 1 and its main jib 4 itself the attachment superstructure 8 and the two main counterweights 9*a*, 9*b* have already been picked up together or individually one after the other from a trailer for transport to the place of usage, and have been placed in a rigging position on a central portion of the lower carriage 2 between the base superstructure 6 and the cabin 7 on the lower carriage 2. In this case, the attachment superstructure 8 has been placed on the lower carriage 2 at a preselected rigging location, so that after the base superstructure 6 has been pivoted with its rear end 6*h* facing forwards in the direction of the cabin 7, the rear end 6*h* of the base superstructure 6 is opposite a front end 8*v* of the attachment superstructure 8 at a small spaced interval. The attachment superstructure 8 is oriented with its central longitudinal axis symmetrically to a central longitudinal axis of the lower carriage 2, as seen from above at its rigging location. An upper first connecting point 6*a* and a lower second connecting point 6*b* are provided at the rear end 6*h* of the base superstructure 6 in order to detachably fasten the attachment superstructure 8 thereto. Respective corresponding upper third connecting points 8*a* and lower fourth connecting points 8*b* are located opposite one another at the front end 8_v_ of the attachment superstructure 8. The first to fourth connecting points 6_a_, 6_b_, 8_a_ and 8_b_ are each designed as conventional single or multi-cut bolt connections. Such bolt connections typically consist of lugs with holes or fork heads with a plurality of lugs and associated bolts, via which the lugs can be detachably connected to one another. In the present case, the first and third connecting points 6_a_ and 8_a_ are each formed as lugs with a bore, and the second connecting point 6_b_ is formed as a hook open at the bottom for receiving a bolt which is fixedly arranged in the fourth connecting point 8_b_ on a lug. When the attachment superstructure 8 is oriented at its rigging location on the lower carriage 2, the centre points of the bores for receiving the bolts of the first to fourth connecting points 6_a_, 6_b_, 8_a_ and 8_b_ are oriented in a vertical direction one behind the other and spaced apart from one another. Furthermore, it is apparent from FIG. 2 that the lugs or hooks of the first to fourth connecting points 6_a_, 6_b_, 8_a_ and 8_b_, as seen from the side on the lower carriage 2, each protrude from the rear end 6_h_ of the base superstructure 6 and the front end 8_v_ of the attachment superstructure 8 and mesh together in the manner of a contact-free toothing arrangement.

After the attachment superstructure 8 having the main counterweights 9_a_, 9_b_ has been placed at its rigging location on the lower carriage 2, with the aid of the auxiliary crane, not shown, or with the vehicle crane 1 and its main jib 4 itself the attachment superstructure 8 and the first and second auxiliary support 15_a_, 15_b_ are picked up together or individually one after the other from a trailer for transport to the place of usage, and are placed at their rigging locations on the lower carriage 2 and a support plate 23 which comprises a rest and which is typically used for supporting the main jib 4. In their rigging locations, the two auxiliary supports 15_a_, 15_b_ are each oriented with their longitudinal axes in parallel with and laterally spaced apart from a central longitudinal direction of the lower carriage 2, as seen from above. Moreover, the two auxiliary supports 15_a_, 15_b_ adjoin the rear end 8_h_ of the attachment superstructure 8 with their respective front ends 15_av_, 15_bv_.

In a next rigging step, the two auxiliary supports 15_a_, 15_b_ are coupled to the rear end 8_h_ of the attachment superstructure 8 with their respective front ends 15_av_, 15_bv_. Alternatively, it is feasible for this coupling to take place also at a later point in time.

Also, in a further rigging step, with the aid of the auxiliary crane, not illustrated, or with the vehicle crane 1 and its main jib 4 itself the first and second auxiliary counterweights 10_a_, 10_b_ are picked up from a trailer for transport to the place of usage, and are placed on the ground 22 at their rigging locations in front of the cabin 7 of the vehicle crane 1 and below the rear ends 15_ah_, 15_bh_ of the first and second auxiliary supports 15_a_, 15_b_.

Furthermore, it can be seen in FIG. 2 that the attachment superstructure 8 has at least one hydraulic rigging cylinder 24 which is arranged centrally in the centre of gravity of the attachment superstructure 8 and is supported on the lower carriage 2. The working direction of the rigging cylinder 24 is vertical and therefore by means of the rigging cylinder 24 the attachment superstructure 8 together with the main counterweights 9_a_, 9_b_ can be raised from the lower carriage 2 from a rigging position to an attachment position. It is also feasible to provide more than one rigging cylinder 24 arranged symmetrically with respect to the centre of gravity of the attachment superstructure 8.

Contrary to the description of FIG. 1, in FIG. 2 a further lifting mechanism 18_a_ is additionally arranged on the base superstructure 4. Also, the further lifting mechanism 18_a_ is typically designed as a hydraulically driven cable drum.

Figure 3:
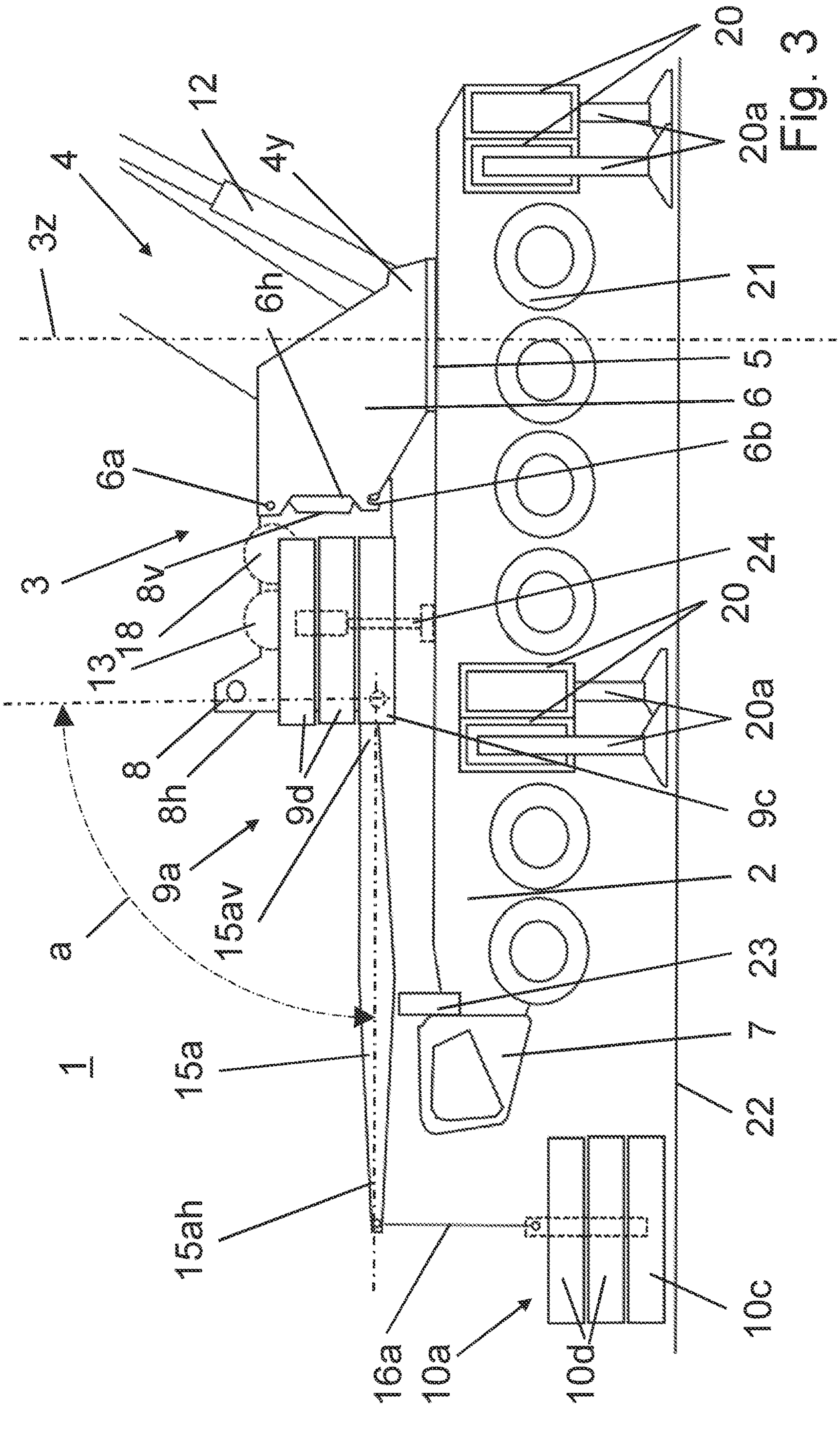
FIG. 3 shows a side view of FIG. 2 in a second rigging state.

FIG. 3 shows a side view of FIG. 2, in which the attachment superstructure 8, the two main counterweights 9_a_, 9_b_, the two auxiliary supports 15_a_, 15_b_ and the two auxiliary counterweights 10_a_, 10_b_ are in a second rigging state. In order to achieve this second rigging state, the attachment superstructure 8 with the two main counterweights 9_a_, 9_b_ has been raised by means of the at least one rigging cylinder 24 from its inoperative position to its attachment position. Solely by means of the vertical movement, the attachment superstructure 8 and the base superstructure 6 have already been automatically coupled in the region of their lower second connecting point 6_b_ and fourth connecting point 8_b_ by virtue of the bolt being driven in the hook which is open at the bottom. In the region of the upper first connecting point 6_a_ and the upper third connecting point 8_a_, the bolts are inserted manually or automatically into the corresponding, now mutually aligned bores of the lugs in order to complete the coupling procedure.

Should the coupling of the two auxiliary supports 15_a_, 15_b_ with their respective front ends 15_av_, 15_bv_ to the rear end 8_h_ of the attachment superstructure 8 not yet have been effected, it can take place now. Alternatively, it is feasible that this coupling is also effected automatically via the lifting movement of the attachment superstructure 8 with the two main counterweights 9_a_, 9_b_ or by means of a corresponding design according to the first to fourth connecting points 6_a_, 6_b_, 8_a_ and 8_b_.

Moreover, in a further rigging step the two auxiliary counterweights 10_a_, 10_b_ are suspended from the respective front ends 15_av_, 15_bv_ of the two auxiliary supports 15_a_, 15_b_ via the first suspension means 16_a_ and the second suspension means 16_b_. At this point in time, the two auxiliary counterweights 10_a_, 10_b_ are still standing on the ground 22.

Figure 4:
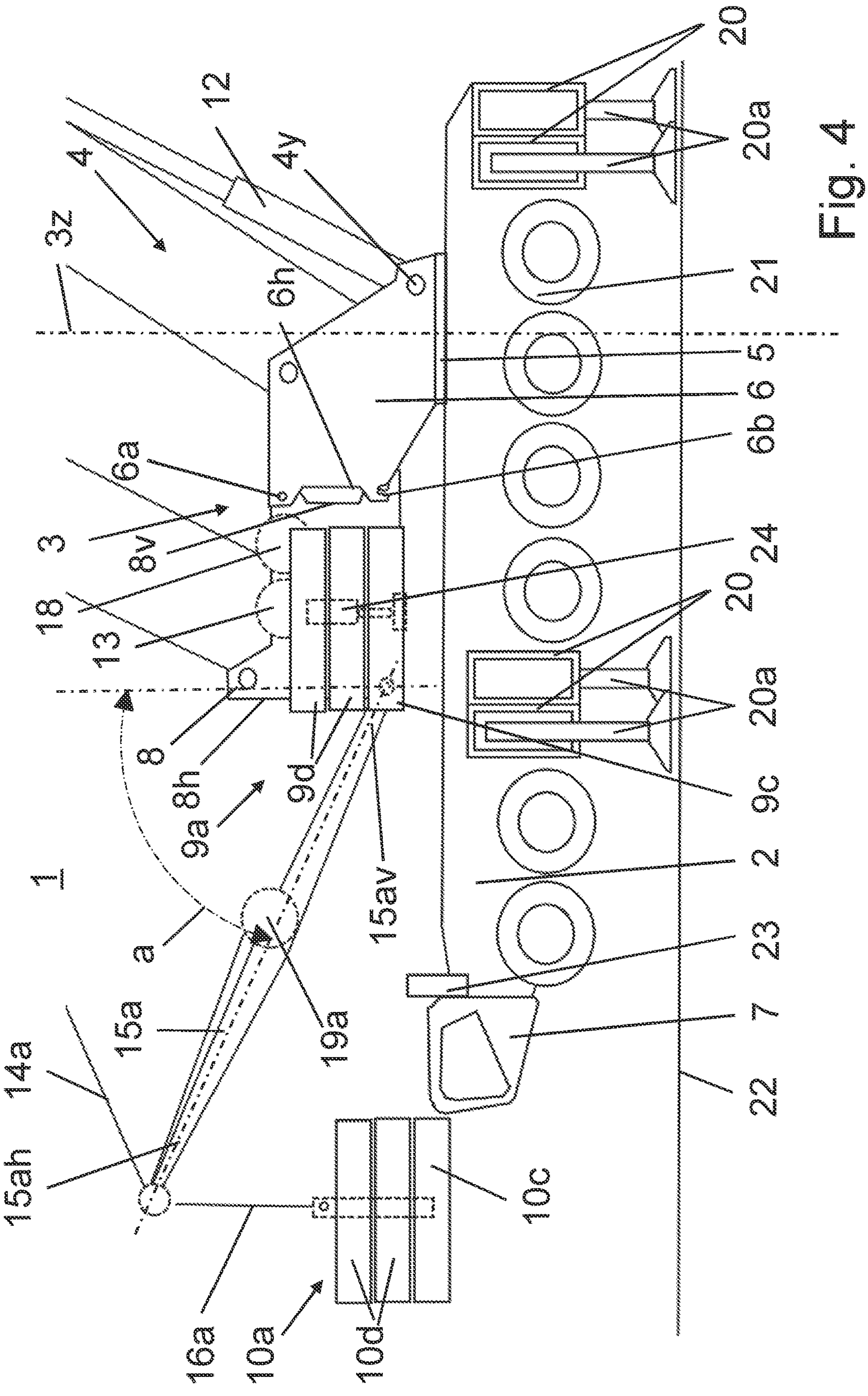
FIG. 4 shows a side view of FIG. 2 in a third rigging state.

FIG. 4 shows a side view of FIG. 2, in which the attachment superstructure 8, the two main counterweights 9_a_, 9_b_, the two auxiliary supports 15_a_, 15_b_ and the two auxiliary counterweights 10_a_, 10_b_ are in a third rigging state. In order to achieve this third rigging state, in a first rigging step after coupling the attachment superstructure 8 to the base superstructure 6, the at least one rigging cylinder 24 has been retracted and therefore is no longer supported on the surface of the lower carriage 2. Subsequently, in a further rigging step, the first guying means 14_a_ and the second guying means 14_b_ are run from the two tensioning mechanisms 19_a_, 19_b_ via the respective rear end 15_ah_, 15_bh_ of the first or second auxiliary supports 15_a_, 15_b_ to the main jib head 4_c_ or the adjoining adapter 17 and are fastened at this location. Then, by tensioning the two guying means 14_a_, 14_b_ via the two tensioning mechanisms 19_a_, 19_b_ or by luffing the main jib 4, the two auxiliary supports 15_a_, 15_b_ are inclined upwards at a desired angle from their substantially horizontal guying position to a working position. As a result, the two auxiliary counterweights 10_a_, 10_b_ are then also raised simultaneously from the ground 22 and generate the desired counterweight moment for the operation of the vehicle crane 1.

Figure 5:
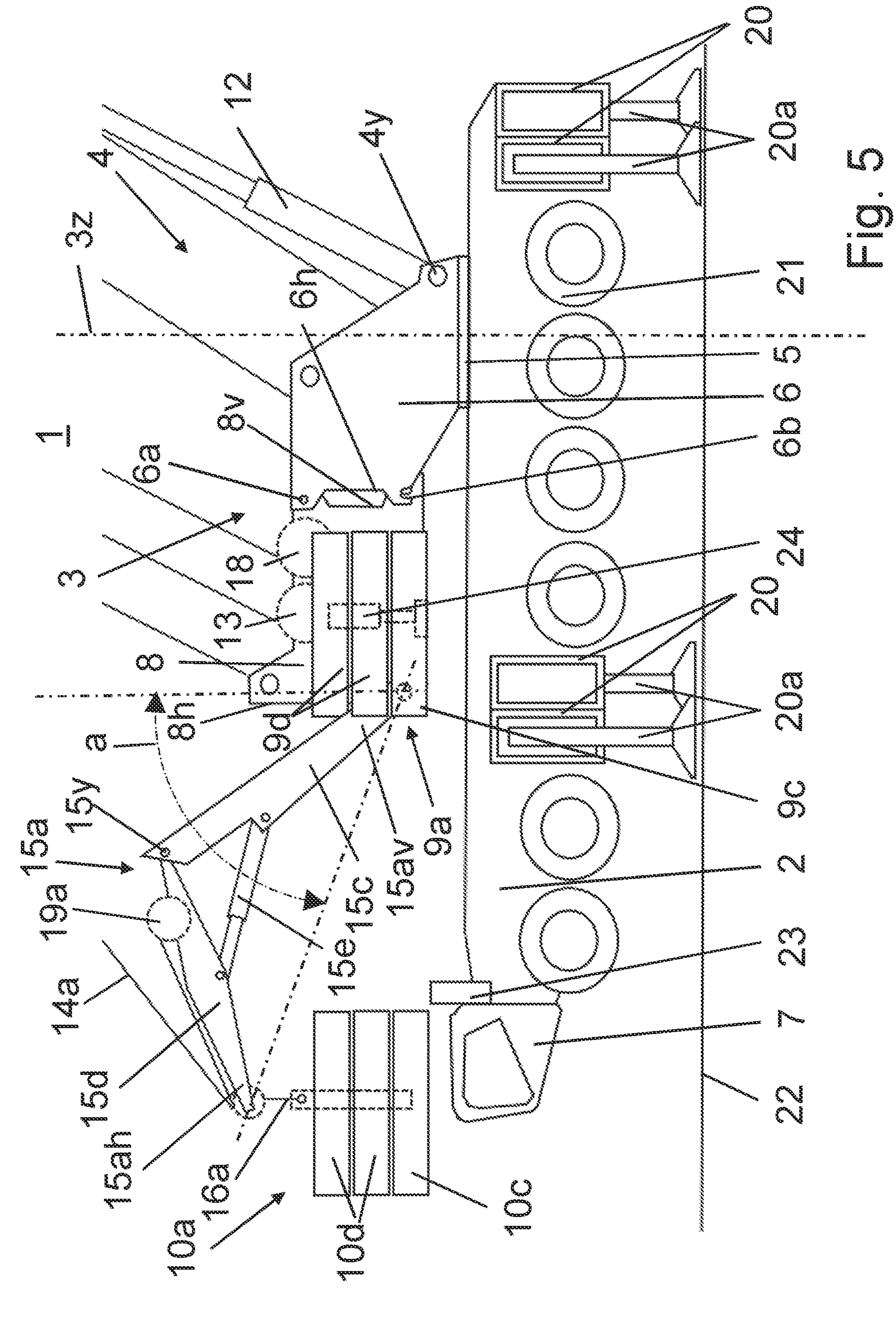
FIG. 5 shows a side view corresponding to FIG. 4 with auxiliary jibs in an alternative design.

FIG. 5 is a further side view which corresponds substantially to FIG. 4 and shows a comparable rigging state. Therefore, reference is made to the previous description relating to FIGS. 1 to 4 and only features deviating therefrom will be described hereinafter. In this case, the auxiliary supports 15_a_, 15_b_ have an alternative design. The previously described auxiliary supports 15_a_, 15_b_ are rigid, formed in one piece, have a predetermined length and are formed as hollow profiles. In contrast, the auxiliary supports 15_a_, 15_b_ according to FIG. 5 are configured so as to be able to be folded centrally about a horizontal folding axis 15*y*. In a corresponding manner, the auxiliary supports 15*a*, 15*b* are divided into a front start portion 15*c* and a rear end portion 15*d* which are connected to one another so as to be able to pivot via a substantially horizontal axis. A hydraulic folding cylinder 15*e* is provided for the pivot movement and is supported accordingly on the one hand on the start portion 15*c* and on the other hand on the end portion 15*d*. The foldable auxiliary supports 15*a*, 15*b* render it possible to vary the desired counterweight radius to a greater extent.

Figure 6:
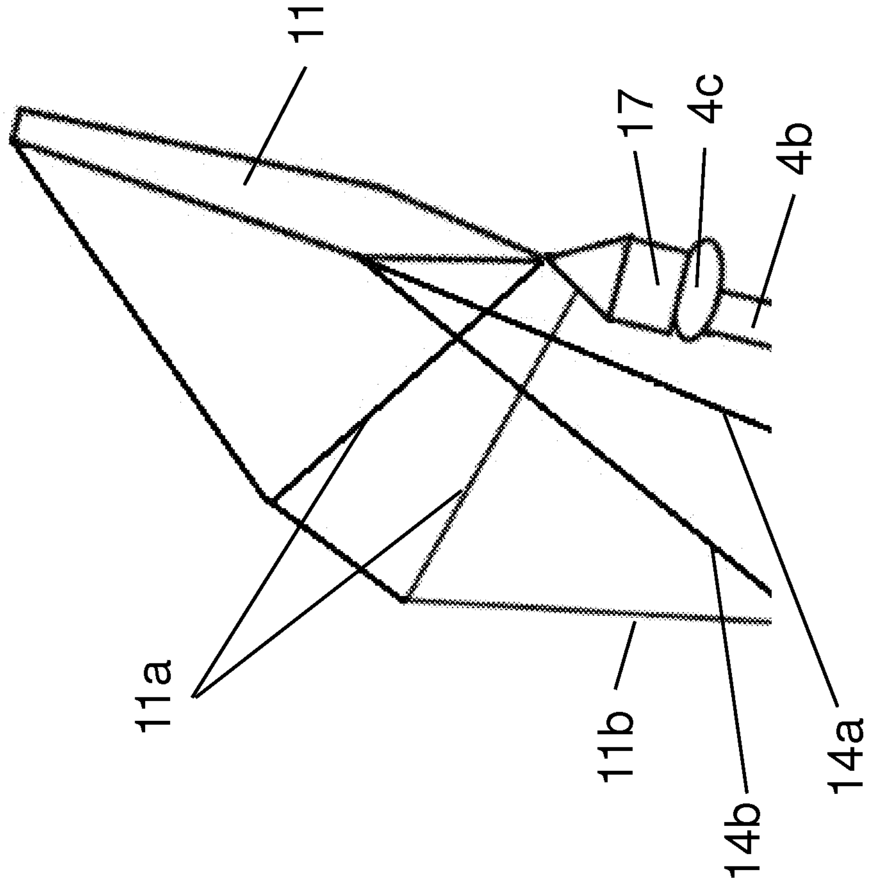
FIG. 6 shows a partial view of an upper portion of an alternative rigging arrangement in which the guying means are connected to the auxiliary jib.

In this case, each of the auxiliary supports 15*a*, 15*b* is also pivotable about an angle a of theoretically 0 degrees to 180 degrees, preferably of 40 degrees to 130 degrees. This angle range is measured between a vertical (illustrated as a dashed line in FIG. 2), extending through the joint with a horizontal pivot axis and a longitudinal axis (illustrated as a dashed line in FIG. 2) of the linearly extended and unfolded auxiliary support 15*a*, 15*b*. FIG. 6 is a partial view of an alternative rigging in which the first and second guying means 14*a*, 14*b* are connected to the auxiliary jib 11.

Changes and modifications in the specifically described embodiments can be carried out without departing from the principles of the present invention which is intended to be limited only by the scope of the appended claims, as interpreted according to the principles of patent law including the doctrine of equivalents. The priority German application no. DE 10 2022 122 282.9, filed on Sep. 2, 2022, is hereby incorporated by reference, in particular for support with regard to the translation for the present disclosure.

The invention claimed is:

1. A vehicle crane comprising:

a superstructure that is rotatably mounted on a lower carriage and has a telescopic main jib, wherein the superstructure consists of a base superstructure and an attachment superstructure arranged in a detachable manner thereon and the attachment superstructure receives at least one main counterweight; and wherein at least one auxiliary support configured as a hinged support is fastened to the attachment superstructure, and wherein a rear end of the auxiliary support is suspended via a guying member, and an auxiliary counterweight is suspended from the rear end of the at least one auxiliary support; and wherein the auxiliary support is fastened to the attachment superstructure such that the auxiliary support can be placed on the ground or the lower carriage.

2. The vehicle crane as claimed in claim 1, wherein the at least one auxiliary support is fastened in an articulated manner to the attachment superstructure.

3. The vehicle crane as claimed in claim 2, wherein the at least one auxiliary support can be pivoted by an angle of 40 degrees to 130 degrees.

4. The vehicle crane as claimed in claim 1, wherein the at least one auxiliary support is at least 3 m long.

5. The vehicle crane as claimed in claim 1, wherein the at least one auxiliary support comprises a first auxiliary support and a second auxiliary support that each have an auxiliary counterweight extending rearwards starting from the attachment superstructure.

6. The vehicle crane as claimed in claim 1, wherein the at least one auxiliary support is configured as a lateral superlift arm.

7. The vehicle crane as claimed in claim 1, wherein the at least one auxiliary support is divided into a start portion and an end portion that are connected to one another so as to be able to be folded in an articulated manner about a horizontal folding axis.

8. The vehicle crane as claimed in claim 1, wherein the attachment superstructure can be raised from a rigging position on the lower carriage to an attachment position next to the base superstructure and the attachment superstructure can be detachably coupled to the base superstructure in the attachment position.

9. The vehicle crane as claimed in claim 1, wherein at least one rigging cylinder is arranged on the attachment superstructure and the attachment superstructure can be raised from the rigging position to the attachment position via said rigging cylinder.

10. The vehicle crane as claimed in claim 1, wherein the at least one main counterweight is stationary relative to the base superstructure during operation of the vehicle crane.

11. The vehicle crane as claimed in claim 1, wherein a first and a second main counterweight are provided that are arranged opposite and spaced apart from one another in relation to a longitudinal direction of the attachment superstructure.

12. The vehicle crane as claimed in claim 1, wherein at least one lifting mechanism and/or winch mechanism are arranged on the attachment superstructure.

13. The vehicle crane as claimed in claim 12, wherein the at least one auxiliary support is placed in a rigging position on the lower carriage and can be coupled to the attachment superstructure.

14. The vehicle crane as claimed in claim 13, wherein a rest is arranged on the lower carriage, on which rest the at least one auxiliary support lies in the rigging position.

15. The vehicle crane as claimed in claim 1, wherein the base superstructure has no counterweight.

16. The vehicle crane as claimed in claim 1, wherein the lower carriage is provided with wheels for travel on roads.

17. The vehicle crane as claimed in claim 1, wherein the rear end of the at least one auxiliary support is suspended via the guying member on the main jib and/or on an adapter at a main jib head, or on an auxiliary jib.

18. A method for rigging a vehicle crane, wherein the vehicle crane comprises a superstructure that is rotatably mounted on a lower carriage and has a telescopic main jib, wherein the superstructure consists of a base superstructure and an attachment superstructure arranged in a detachable manner thereon and the attachment superstructure receives at least one main counterweight, said method comprising:

placing at least one auxiliary support in a rigging position on the lower carriage;

fastening the at least one auxiliary support to the attachment superstructure;

guying a rear end of the at least one auxiliary support via a guying member on a main jib head and/or on an adjoining adapter, or an auxiliary jib; and suspending the auxiliary counterweight from the rear end of the at least one auxiliary support;

wherein the at least one auxiliary support is configured as a hinged support with the rear end of the at least one auxiliary support being suspended via the guying member.

19. The method as claimed in claim 18, wherein, before placing the at least one auxiliary support, the attachment superstructure is placed in a rigging position on the lower carriage, the attachment superstructure is raised with at least one rigging cylinder from the rigging position on the lower carriage to an attachment position next to the base superstructure and the attachment superstructure is fastened to the base superstructure.

20. The method as claimed in claim 18, wherein the at least one auxiliary support is fastened to the attachment superstructure in the rigging position on the lower carriage or in an attachment position of the at least one auxiliary support.

21. The method as claimed in claim 18, wherein the attachment superstructure or the main counterweight or the auxiliary support are placed for the rigging procedure onto the lower carriage of the vehicle crane by the vehicle crane itself.

* * * * *